United States Patent
Lee et al.

(10) Patent No.: US 8,014,680 B2
(45) Date of Patent: Sep. 6, 2011

(54) OPTICAL TRANSCEIVER AND METHOD OF CONTROLLING OPTICAL OUTPUT JITTER USING THE SAME

(75) Inventors: Joon Ki Lee, Daejeon (KR); Jyung Chan Lee, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 840 days.

(21) Appl. No.: 11/935,191

(22) Filed: Nov. 5, 2007

(65) Prior Publication Data

US 2008/0107423 A1    May 8, 2008

(30) Foreign Application Priority Data

Nov. 6, 2006 (KR) .................. 10-2006-0109071

(51) Int. Cl.
*H04B 10/00* (2006.01)
(52) U.S. Cl. ........ 398/136; 398/164; 398/135; 398/128; 398/137; 398/158; 398/159; 398/155; 385/88; 385/89; 385/92; 385/93; 375/220; 375/340; 375/285; 375/222
(58) Field of Classification Search .................. 398/135, 398/136, 137, 138, 139, 128, 130, 79, 182, 398/183, 192, 193, 202, 208, 209, 214, 164, 398/147, 158, 159, 155, 161, 33, 38; 385/88, 385/89, 90, 92, 93; 375/220, 340, 222, 285, 375/333
See application file for complete search history.

(56) References Cited

U.S. PATENT DOCUMENTS

| | | | |
|---|---|---|---|
| 7,373,087 B2 * | 5/2008 | Shi et al. ...................... 398/147 |
| 2004/0013184 A1 * | 1/2004 | Tonietto et al. ............... 375/220 |
| 2004/0114912 A1 | 6/2004 | Okamoto et al. | |
| 2005/0175355 A1 * | 8/2005 | Hauenschild et al. ........ 398/161 |
| 2007/0031153 A1 * | 2/2007 | Aronson et al. .............. 398/138 |

FOREIGN PATENT DOCUMENTS

JP    10-069657    3/1998

* cited by examiner

*Primary Examiner* — Hanh Phan
(74) *Attorney, Agent, or Firm* — Rabin & Berdo, P.C.

(57) ABSTRACT

An optical transceiver which can effectively reduce optical output jitter when an error is made during designing and manufacturing of a printed circuit board (PCB), and a method of controlling optical output jitter using the optical transceiver are provided. The optical transceiver includes a transmitter unit including an equalizing (EQ) filter which can reduce jitter of a high speed electric signal; a control circuit which controls the EQ filter; a receiver unit which receives an optical signal; and a micro-controller which controls the transmitter unit and the receiver unit. Further included in the optical transceiver is an active type or passive type EQ filter and, in the case of the active type, the control circuit is used to control the filter, in order to compensate for high-frequency component of a high speed electric signal in the transmitter unit in order to reduce reflection or loss on the PCB, and thus deterministic optical output jitter occurring due to Inter-Symbol Interference (ISI) can be reduced.

8 Claims, 7 Drawing Sheets

OPTICAL TRANSCEIVER AND METHOD OF CONTROLLING OPTICAL OUTPUT JITTER USING THE SAME

CROSS-REFERENCE TO RELATED PATENT APPLICATION

This application claims the benefit of Korean Patent Application No. 10-2006-0109071, filed on Nov. 6, 2006, in the Korean Intellectual Property Office, the disclosure of which is incorporated herein in its entirety by reference.

BACKGROUND OF THE INVENTION

1. Field of the Invention

This work was supported by the IT R&D program of MIC/IITA. [2006-S-059-01, ASON based Metro Photonic Cross-Connect Technology]

The present invention relates to an optical communication device, and more particularly, to an optical transceiver which can control optical output jitter and a method of controlling optical output jitter using the optical transceiver.

2. Description of the Related Art

An optical transceiver is a communication module which carries out optical-electric conversion and electric-optical conversion in an optical communication system. Due to increases in speed of the optical communication devices, optical transmission speed of the optical transceiver has increased to over 10 Gb/s, however, the size of the module has become smaller. Also, in order to increase price competitiveness, FR-4, which is generally used in existing materials having low permittivity, is used in a printed circuit board (PCB) used in the optical transceiver having the optical transmission speed of 10 Gb/s.

When a high-speed electrical signal having an optical transmission speed of 10 Gb/s is transmitted through FR-4, high-frequency components of the signal is significantly reduced due to dielectric loss of the FR-4. In addition, if an impedence matching among a package of a chip, a Packet Assembly/Disassembly (PAD), and a transmission line is not well accomplished, reflection of high-frequency component greatly occurs and thus causes jitter.

Figure 1:
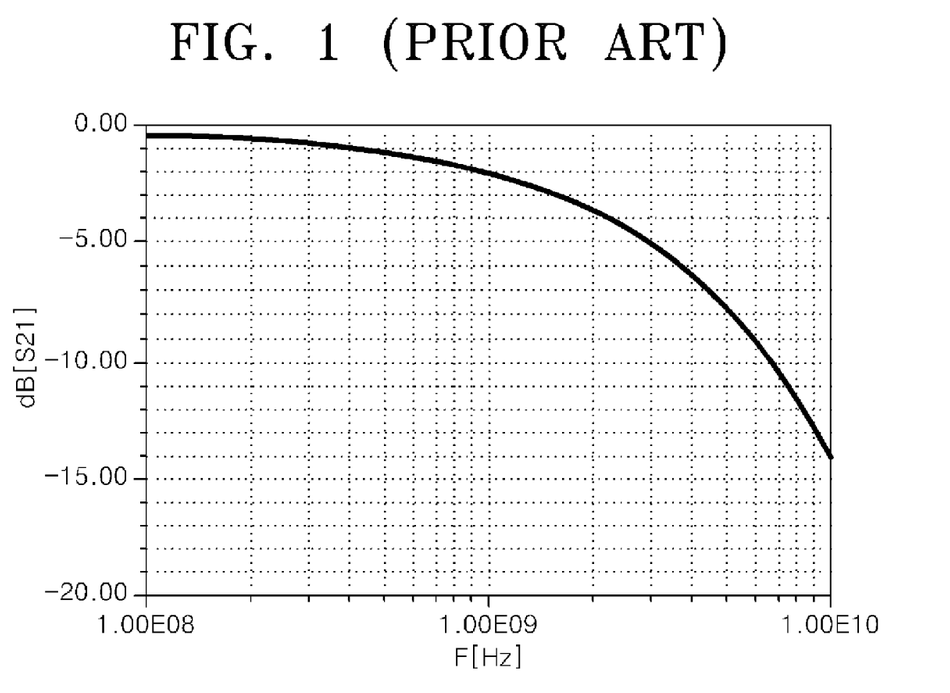
FIG. 1 is a graph illustrating attenuation of an electric signal in a transmission line on a conventional printed circuit board (PCB)

FIG. 1 is a graph illustrating attenuation of an electric signal S21 in a Transmission line on a conventional PCB. It shows a transmission characteristic S21 when an electrical signal having the optical transmission speed of 10 Gb/s is transmitted via the transmission line of the PCB that is formed of FR-4. As shown in FIG. 1, high attenuation occurs for high-frequency component.

Figure 2:
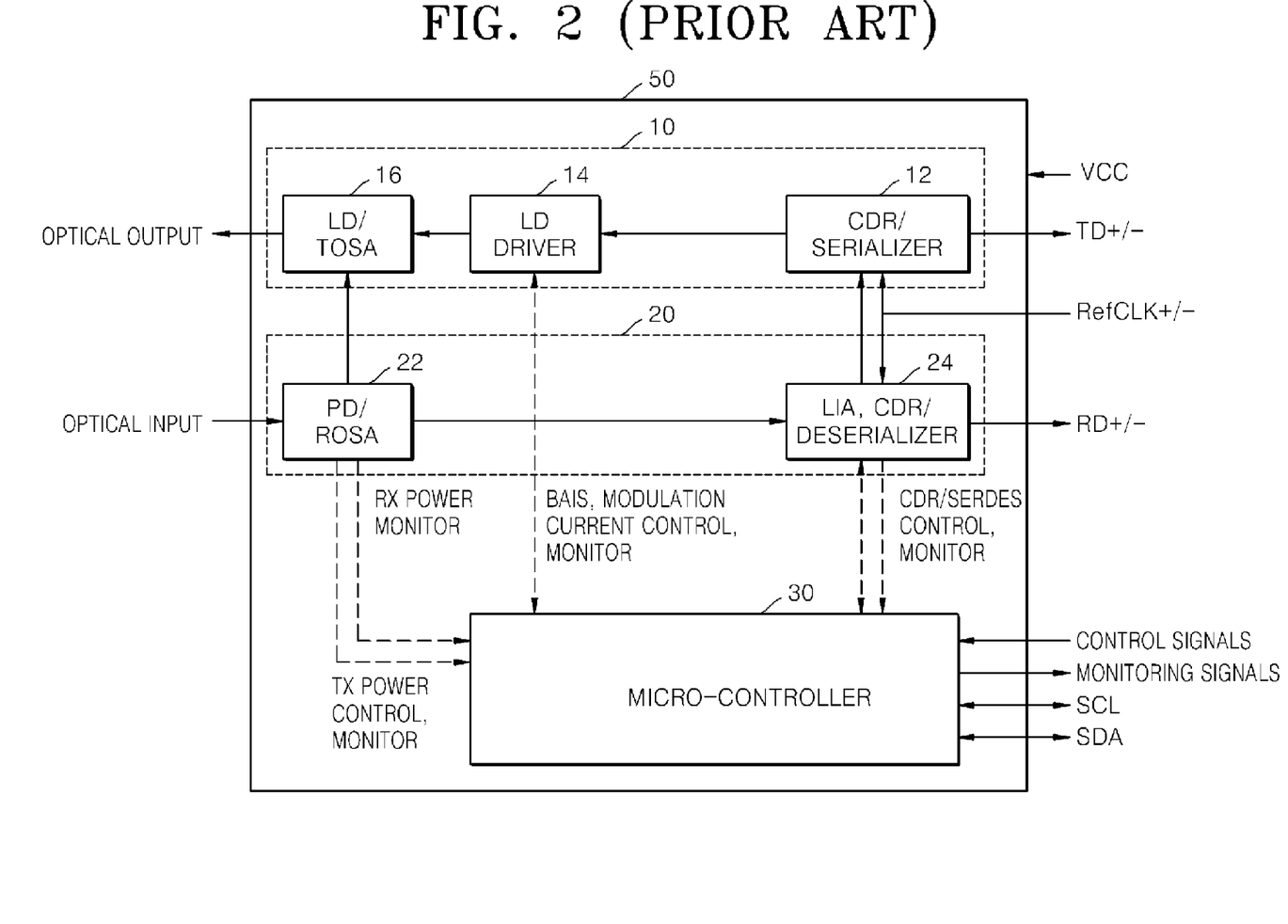
FIG. 2 is a block diagram of a conventional optical transceiver.

FIG. 2 is a block diagram of a conventional optical transceiver.

Referring to FIG. 2, when a conventional optical transceiver 50 is a XFP (10 Gb/s Small Form-factor Pluggable) transceiver, transmitted data TD+/− at the optical transmission speed of 10 Gb/s is input into the transceiver through a connector. Then, electric-optical conversion occurs, so that the transmitted data TD+/− is converted into an optical signal of 10 Gb/s in a Transmitter Optical Sub-Assembly (TOSA) 16 through a Clock and Data Recovery (CDR) unit 12 and a Laser Diode (LD) driver 14 and then the optical signal is transmitted through an optical fiber. Meanwhile, when the optical transceiver 50 is a 300-pin Multi-Source Agreement (MSA) transceiver, 600 Mb/s×16 streams of transmitted data TD+/− are input into of the transceiver through a connector. Then the transmitted data TD+/− is converted into an electric signal of 10 Gb/s in a serializer 12 and is converted into an optical signal through the LD driver 14 and an LD module 16.

In the case of the XFP transceiver, an optical signal is received as received data RD +/− through a Receiver Optical Sub-Assembly (ROSA) 22, a limiting amplifier (LIA), and a Clock and Data Recovery (CDR) 24. In the case of the 300-pin MSA transceiver, an optical signal is received as received data RD +/−through a Photo Diode (PD) 22 and a deserializer 24. A micro-controller 30 controls devices included in a transmission unit 10 and a receiving unit 20 of the optical transceiver 50.

Parts that perform such functions described above are connected with each other on the PCB so as to transmit signals and thus transmission lines that can transmit an electric signal having a optical transmission speed of 10 Gb/s should be precisely designed and manufactured, otherwise, an Inter-Symbol Interference (ISI) phenomenon is accumulated every time a high-frequency signal passes through the parts due to reflection and attenuation of the high-frequency signal and thus jitter is significantly increased in a final optical output stage. A characteristic of an optical output jitter is important among various characteristics of an optical transceiver which affect the performance of the optical transceiver and thus a PCB should be carefully designed and manufactured to allow the optical transceiver to be able to perform at optical transmission speeds of over 10 Gb/s.

SUMMARY OF THE INVENTION

The present invention provides an optical transceiver which can effectively reduce optical output jitter when an error is made during designing and manufacturing of a printed circuit board (PCB), and a method of controlling optical output jitter using the optical transceiver.

According to an aspect of the present invention, there is provided an optical transceiver including: a transmitter unit including an equalizing (EQ) filter which can reduce jitter of a high speed electric signal; a control circuit which controls the EQ filter; a receiver unit which receives an optical signal; and a micro-controller which controls the transmitter unit and the receiver unit.

When the optical transceiver is an XFP transceiver (10 Gb/s small form-factor pluggable), the transmitter unit may include a Clock and Data Recovery (CDR) unit, a Laser Diode (LD) driver, and a Transmitter Optical Sub-Assembly (TOSA), and the EQ filter is interposed between the CDR unit and the LD driver, and when the optical transceiver is a 300-pin Multi-Source Agreement (MSA) transceiver, the transmitter unit may include a serializer, the LD driver, and a Laser Diode (LD) module, and the EQ filter is interposed between the serializer and the LD driver.

The EQ filter may include: a receiver which receives an electric signal from the CDR unit or the serializer; an output driver which directly receives the signal outputted from the receiver; and a pre-emphasis driver which receives the signal outputted from the receiver via a delay device, wherein the optical transceiver comprises a filter control circuit that is connected to the micro-controller to control the EQ filter. The filter control circuit may include a Digital to Analog (D/A) Converter which converts a digital control signal for controlling the filter from the micro-controller into an analog signal; and a delay & gain controller which controls the signal from the D/A converter to provide an appropriate voltage to the filter so as to control the delay time of the delay device and the gain of the pre-emphasis driver.

Such EQ filter is an active type filter, and high-frequency component of the signal is amplified using the EQ filter and thus optical output jitter may be reduced.

Meanwhile, the EQ filter may be embodied by at least one high pass filter, and when the EQ filter is embodied using at least two or more high pass filters, each filter may be connected in series. The high pass filter may be embodied using a lumped RLC device or a microstrip line transmission line.

Such EQ filter is a passive type filter, and the passive type EQ filter blocks low-frequency components, thereby reducing optical output jitter.

According to another aspect of the present invention, there is provided a method of controlling optical output jitter using the optical transceiver described above, the method including: reducing jitter of a high speed electric signal, wherein when the optical transceiver is a XFP transceiver (10 Gb/s Small Form-factor Pluggable), the transmitter unit comprises a Clock and Data Recovery (CDR) unit, and a Laser Diode (LD) driver, and a Transmitter Optical Sub-Assembly (TOSA), and the EQ filter is interposed between the CDR unit and the LD driver, and when the optical transceiver is a 300-pin Multi-Source Agreement (MSA) transceiver, the transmitter unit comprises a serializer, the LD driver, a Laser Diode (LD) module, and the EQ filter is interposed between the serializer and the LD driver.

The EQ filter may include: a receiver which receives an electric signal from the CDR unit or the serializer; an output driver which directly receives the signal outputted from the receiver; and a pre-emphasis driver which receives the signal outputted from the receiver through a delay device, wherein the optical transceiver comprises a filter control circuit that is connected to the micro-controller to control the EQ filter and the EQ filter amplifies high-frequency component, thereby reducing optical output jitter.

In addition, the EQ filter is embodied as at least one high pass filter, and when the EQ filter is embodied by two or more high pass filters, each filter is connected in series, wherein the EQ filter blocks high-frequency component using the EQ filter and thus optical output jitter may be reduced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements, and the sizes and thicknesses of layers and regions are exaggerated for clarity. Also, the terms used herein are defined according to the functions of the present invention. Thus, the terms may vary depending on users or operators and usages. That is, the terms used herein must be understood based on the descriptions made herein.

Figure 3:
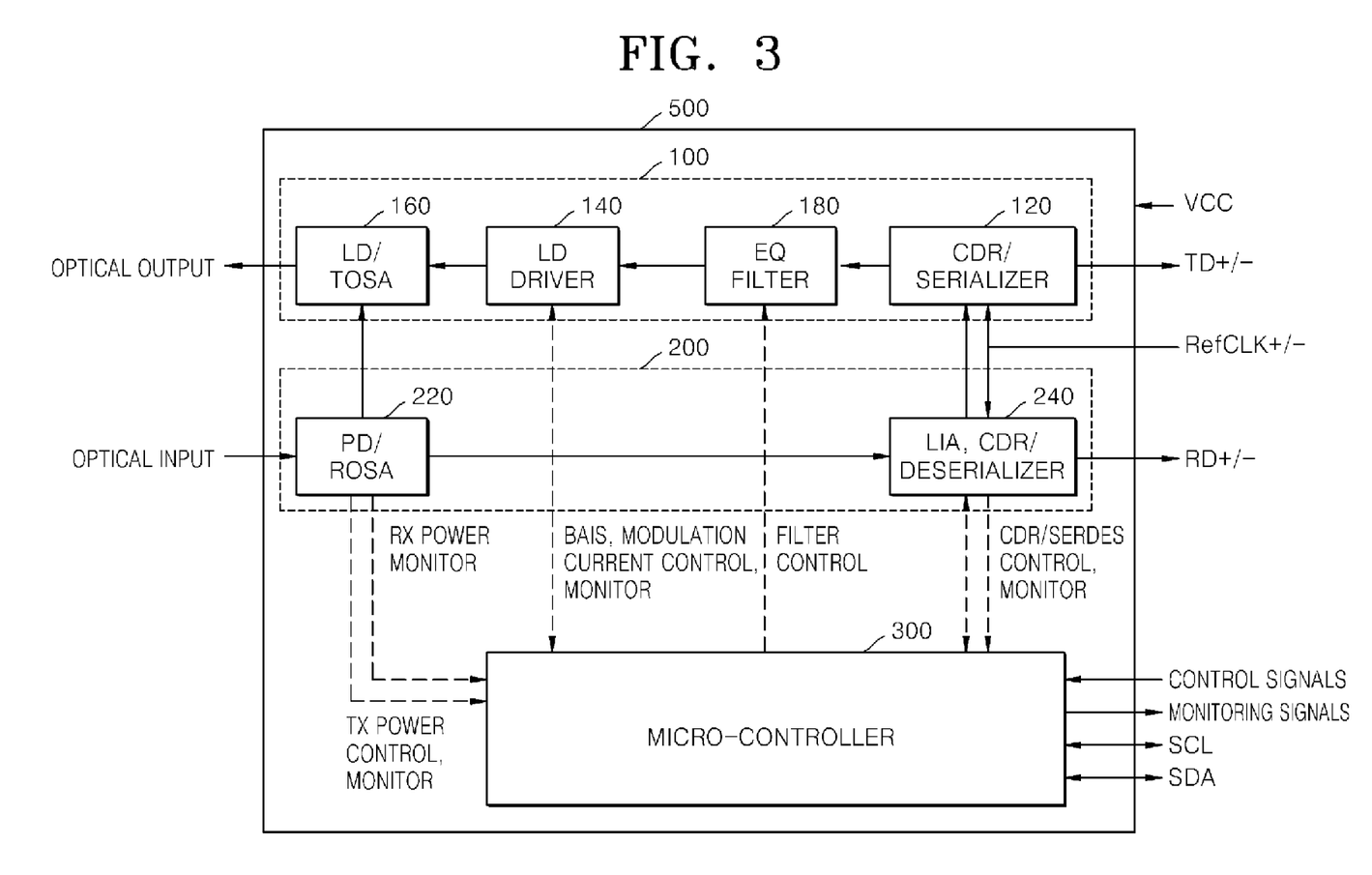
FIG. 3 is a block diagram schematically illustrating an optical transceiver according to an embodiment of the present invention.

FIG. 3 is a block diagram schematically illustrating an optical transceiver according to an embodiment of the present invention.

Referring to FIG. 3, similar to a conventional optical transceiver, an optical transceiver 500 according to an embodiment of the present invention includes a transmitter unit 100, a receiver unit 200, and a micro-controller 300 that controls each device included in the transmitter unit 100 and the receiver unit 200. However, different from a conventional optical transceiver, the optical transceiver 500 further includes an equalizer (EQ) filter 180 used to reduce optical output jitter of the transmitter unit 100.

In other words, when the optical transceiver 500 is a XFP transceiver, the transmitter unit 100 includes a Clock and Data Recovery (CDR) unit 120, a Laser Diode (LD) driver 140, a Transmitter Optical Sub-Assembly (TOSA) 160, and the EQ filter 180 interposed between the CDR 120 and the LD driver 140. When the optical transceiver 500 is a 300-pin Multi-Source Agreement (MSA) transceiver, the transmitter unit 100 includes a serializer 120, the LD driver 140, a Laser Diode (LD) module 160, and the EQ filter 180 interposed between the serializer 120 and the LD driver 140.

The functions of the transmitter unit 100 included in the optical transceiver 500 according to an embodiment of the present invention will be briefly described.

Figure 6:
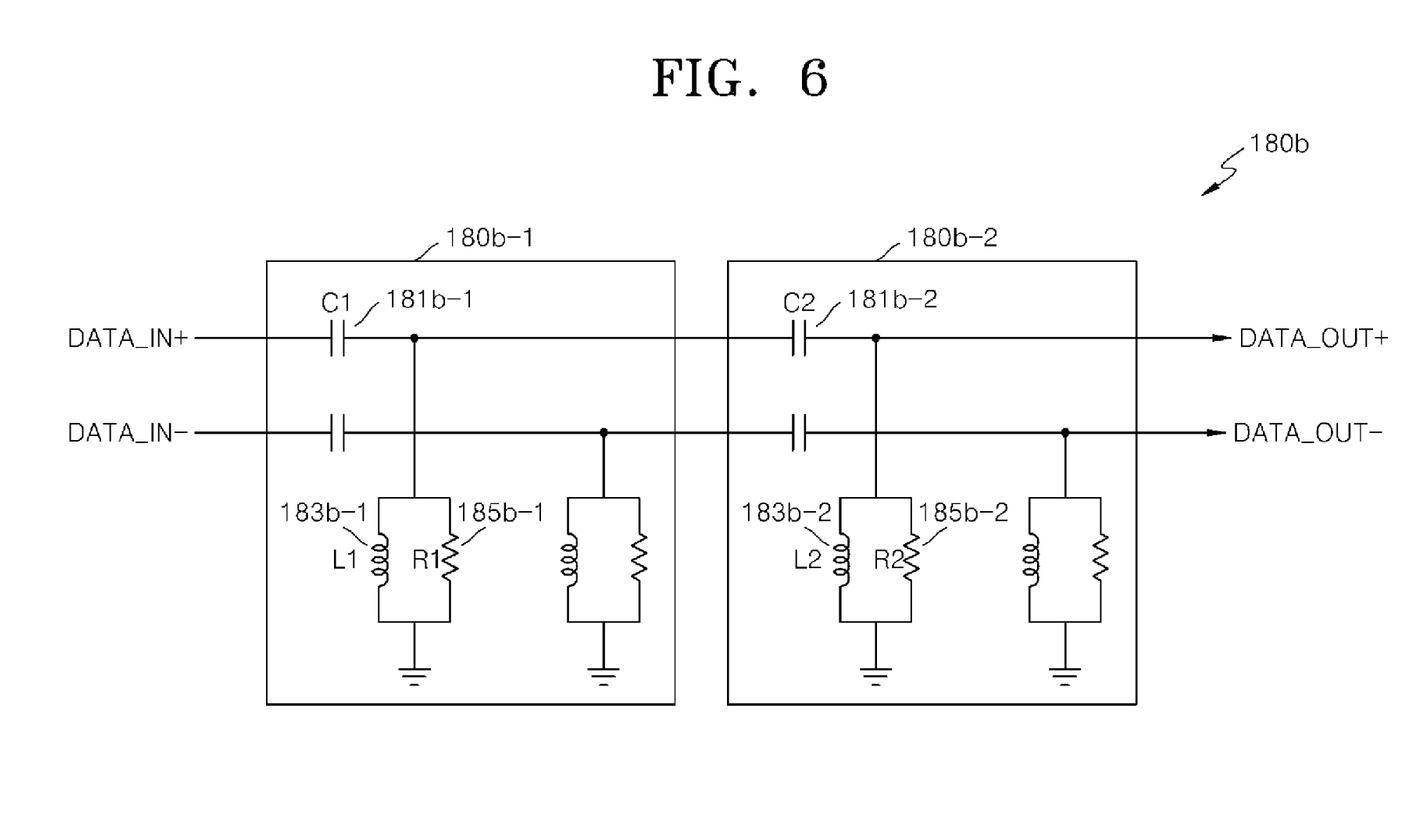
FIG. 6 is a diagram illustrating a passive type EQ filter applied in the optical transceiver of FIG. 3, according to another embodiment of the present invention.

A 10 Gb/s electric signal outputted from the CDR 120 or serializer 120 is compensated for high-frequency components through the EQ filter 180 and then the electric signal is converted into an optical signal through the LD driver 140 and the LD module 160 or the TOSA 160. Accordingly, since the optical transceiver 500 includes the EQ filter 180 in the transmitter unit 100, loss in a printed circuit board (PCB) or loss due to impedance mismatching can be compensated and thus optical output jitter can be reduced. Here, the EQ filter 180 may be embodied by an active type circuit or a passive type circuit, embodiments of which are illustrated in FIG. 4 and FIG. 6, respectively.

Figure 4:
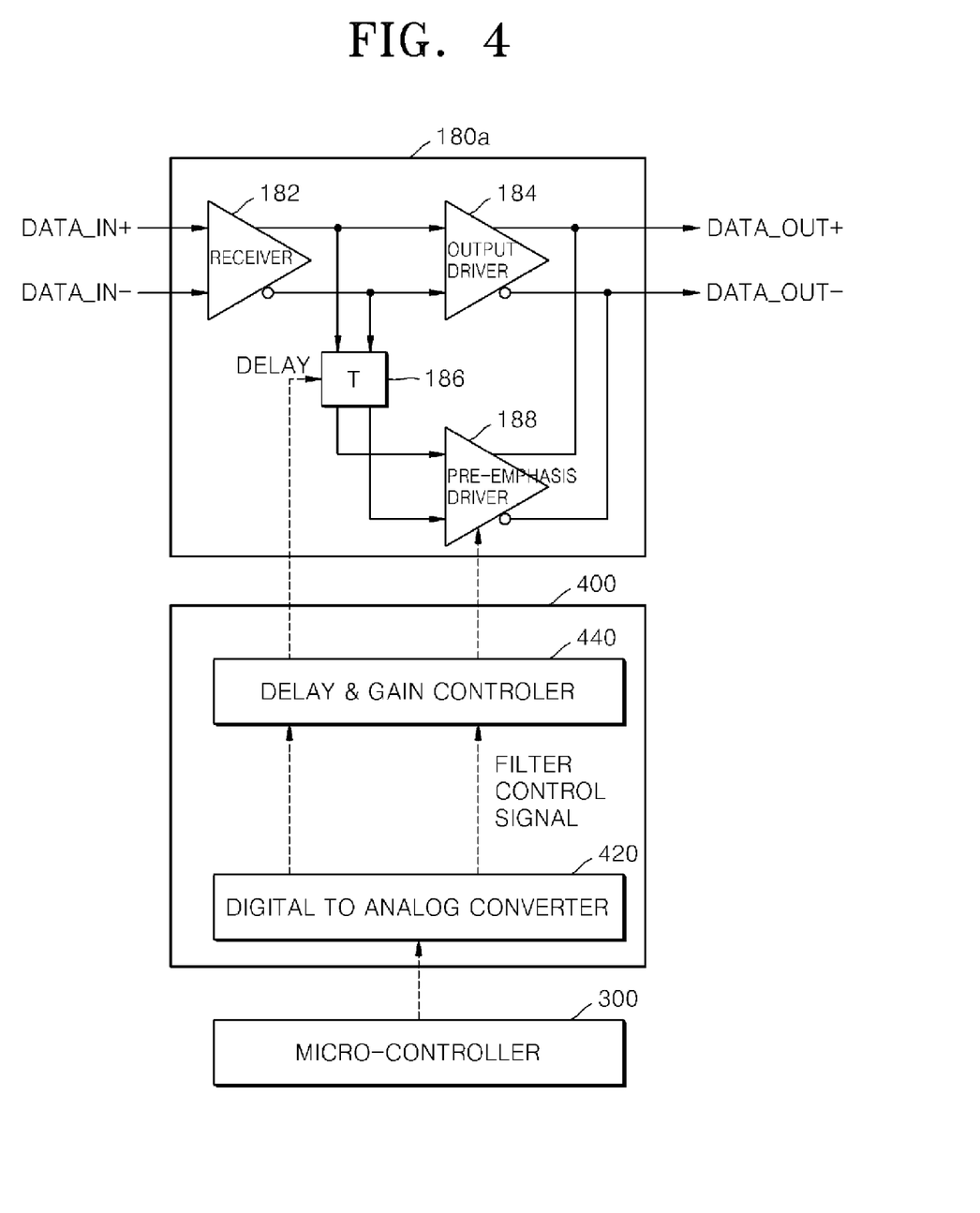
FIG. 4 is a diagram illustrating an active type equalizer (EQ) filter and a filter control circuit applied in the optical transceiver of FIG. 3, according to an embodiment of the present invention.

FIG. 4 is a diagram illustrating the active type EQ filter and a filter control circuit applied in the optical transceiver 500 of FIG. 3, according to an embodiment of the present invention.

Referring to FIG. 4, the active type EQ filter 180a includes a receiver 182, an output driver 184, a delay device 186, and a pre-emphasis driver 188, wherein the receiver 182 receives a 10 Gb/s electric signal Data_In +/− outputted from the CDR 120 or the serializer 120, the output driver 184 directly receives the signal outputted from the receiver 182, the delay device 186 delays the signal from the receiver 182, and the pre-emphasis driver 188 receives the delayed signal from the delay device 186.

Meanwhile, when the EQ filter 180a is formed using an active type, the optical transceiver 500 may include a filter control circuit 400 to control the EQ filter 180. The filter control circuit 400 includes a Digital to Analog (D/A) Converter 420 and a delay & gain controller 440, wherein the D/A converter 420 converts a digital control signal from the microcontroller 300 into an analog signal, and the delay & gain controller 440 controls a signal from the D/A converter 420 to provide an appropriate voltage for the delay device 186 and the pre-emphasis driver 188 so as to control the delay time of the delay device 186 and the gain of the pre-emphasis driver 188.

The function of the active type EQ filter 180a 180 will be briefly described. A 10 Gb/s electric signal Data_In +/− outputted from the CDR 120 or the serializer 120 is inputted into the receiver 182, and the signal outputted from the receiver 182 is split into two branches so that one branch is inputted into an output driver 184 and the other branch is inputted into the pre-emphasis driver 188 via the delay device 186 to be amplified, and subsequently recombined with the output of the output driver 184. In this case, as described above, the delay time of the delay device 186 and the gain of the pre-emphasis driver 188 should be controlled by the micro-controller 300 through the filter control circuit 400. Since an optical output jitter can be measured using a wide-bandwidth oscilloscope, optical output is monitored, while the delay time and the gain of the pre-emphasis driver 188 are controlled, thereby minimizing an optical output jitter.

Figure 5:
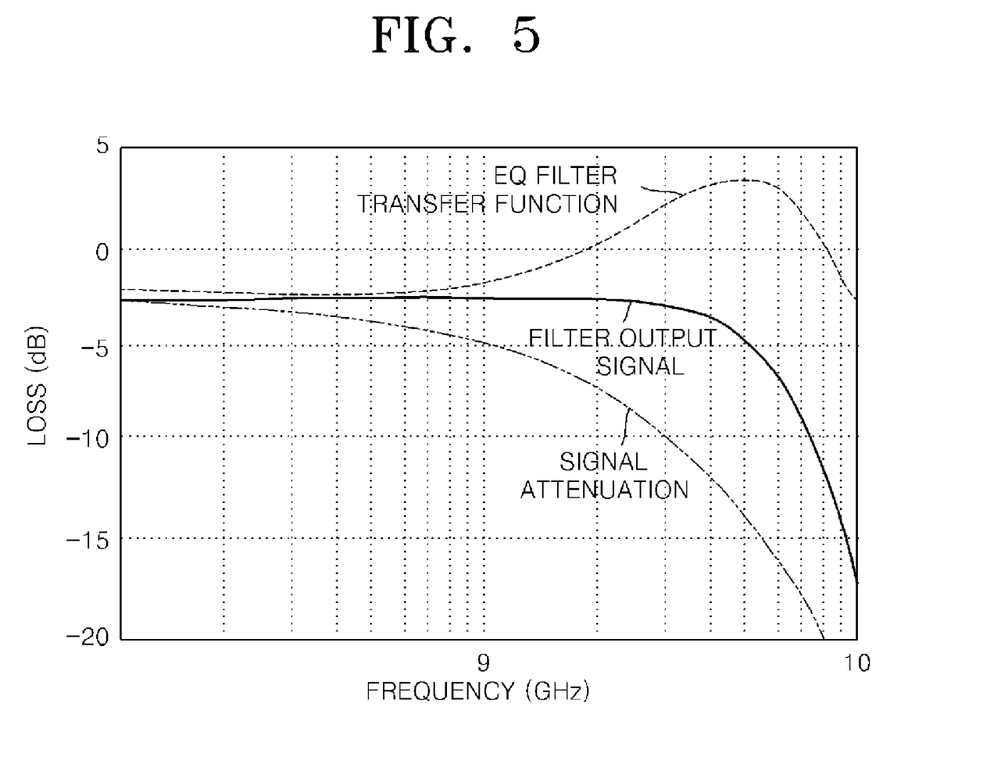
FIG. 5 is a graph illustrating characteristics of electrical signal transmission by the optical transceiver using the active type EQ filter 180 of FIG. 4.

FIG. 5 is a graph illustrating characteristics of electrical signal transmission by the optical transceiver 500 using the active type EQ filter 180a of FIG. 4.

Referring to FIG. 5, a transfer function (indicated by a dotted line) of the active type EQ filter 180a is amplified in a high-frequency region, and an output signal (indicated by an alternate long and two short dashes line) of a conventional optical transceiver is attenuated in a high-frequency region. Therefore, the EQ filter 180 is embodied by the active type EQ filter 180a in the optical transceiver 500 and thus signal reduction occurring in a high-frequency region can be compensated. In other words, an output power signal (indicated by a solid line) of the optical transceiver 500 according to an embodiment of the present invention using the active type EQ filter 180a significantly compensates for high-frequency component that have higher signal attenuation when no EQ filter is used. Consequently, the optical transceiver according to an embodiment of the present invention compensates for signal attenuation occurring in a high-frequency region through an EQ filter and thus optical output jitter can be reduced.

FIG. 6 is a diagram illustrating a passive type EQ filter 180b applied in the optical transceiver 500 of FIG. 3, according to another embodiment of the present invention.

Referring to FIG. 6, the passive type EQ filter 180b can be embodied by at least one high pass filter. When the passive type EQ filter 180b is embodied by two or more high pass filters, each high pass filter is connected in series.

In each high pass filter, each data line is connected to a capacitor, and an inductor and resistor pair, connected to each other in parallel, is connected between each data line and ground. For example, in the embodiment illustrated in FIG. 6, each data line DATA_IN+/− is connected to each high pass filter 180b-1 and 180b-2. In each high pass filter 180b-1 and 180b-2, each data line DATA_IN+/− is connected to a capacitor 181b-1 and 181b-2. Furthermore, in each high pass filter 180b-1 and 180b-2, each data line DATA_IN+/− is connected to ground via pairs of inductor 183b-1 and resistor 185b-1, and inductor 183b-2 and resistor 185b-2, wherein in each inductor-resistor pair the resistor and inductor are connected in parallel. However, at the speed of 10 Gb/s, the high pass filters may be connected using a microstrip transmission line, instead of a lumped Resistance/Inductance/Capacitance (RLC) device.

The functions of the passive type EQ filter 180b, that is, a high pass filter, will be briefly described.

A 10 Gb/s electric signal Data_In +/− outputted from the CDR 120 or the serializer 120 is inputted into a series of high pass filters 180b-1 and 180b-2 and blocks low-frequency signals that have relatively low attenuation. Consequently, signal attenuation is similar for both high-frequency and low-frequency regions and thus optical output jitter can be reduced.

Figure 7:
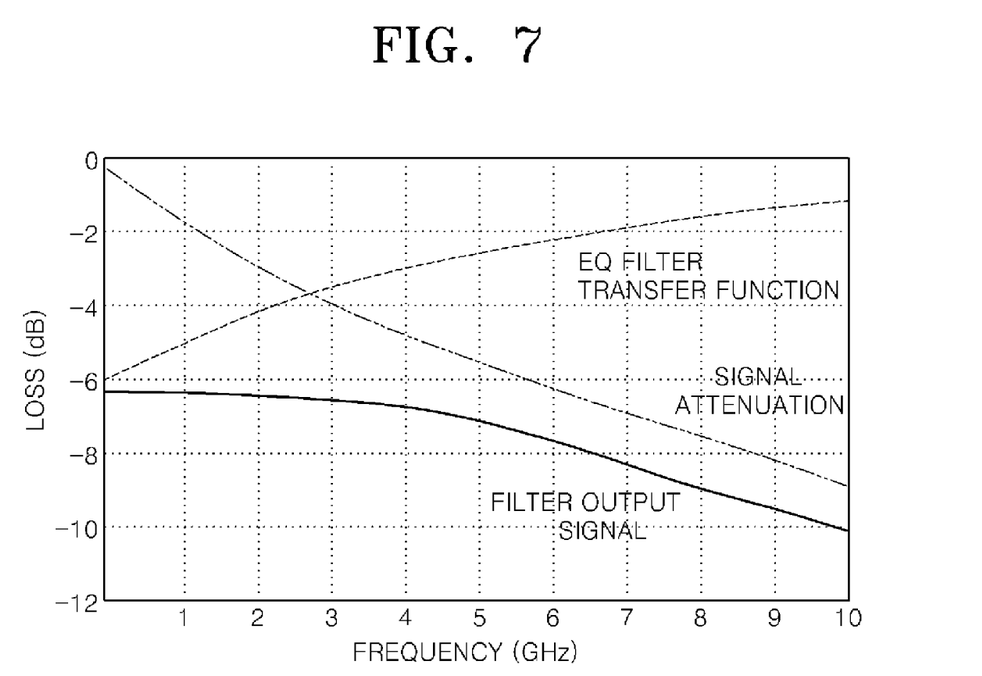
FIG. 7 is a graph illustrating characteristics of electrical signal transmission by the optical transceiver using the passive type EQ filter of FIG. 6.

FIG. 7 is a graph illustrating the characteristics of an electrical signal transmission by the optical transceiver 500 using the passive type EQ filter 180b of FIG. 6.

Referring to FIG. 7, a transfer function (indicated by a dotted line) of the passive type EQ filter 180b blocks signals of a low-frequency region and thus controls signal attenuation in a low-frequency region. In other words, an output power signal (indicated by an alternate long and two short dashes line) in a low-frequency region of the conventional optical transceiver is attenuated by the passive type EQ filter 180b and thus consequently signal attenuation is similar in both high-frequency and low-frequency regions. Therefore, the optical transceiver using the passive type EQ filter according to an embodiment of the present invention blocks a low frequency signal which originally has relatively low signal attenuation in an optical transceiver and thus optical output jitter can be reduced.

Characteristics of a filter output signal of the passive type EQ filter depend on a transfer function graph. Therefore, in order to reduce jitter, at least two high pass filters may be connected in series. Meanwhile, in the passive type EQ filter, a size of an output signal is decreased after the signal passes through the EQ filter but the passive type is easier to embody than the active type.

As described above, the optical transceiver according to the present invention further includes the active type or passive type EQ filter and, in the case of the active type, a circuit used to control the EQ filter, in order to compensate for high-frequency component of a high speed electric signal in the transmitter unit, that is, to compensate for high-frequency component due to reflection or loss in the PCB and thus deterministic optical output jitter occurring due to ISI can be reduced.

Therefore, a clearer eye diagram can be obtained. In addition, errors inevitably made during designing and manufacturing the high-speed PCB can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical transceiver comprising:
a transmitter unit including an equalizing (EQ) filter which can reduce jitter of a high speed electric signal;
a control circuit which controls the EQ filter;
a receiver unit which receives an optical signal; and
a micro-controller which controls the transmitter unit and the receiver unit,
wherein the optical transceiver is an XFP transceiver (10 Gb/s small form-factor pluggable) or a 300-pin Multi-Source Agreement (MSA) transceiver,
wherein when the optical transceiver is an XFP transceiver (10 Gb/s small form-factor pluggable), the transmitter unit comprises a Clock and Data Recovery (CDR) unit, a Laser Diode (LD) driver, and a Transmitter Optical Sub-Assembly (TOSA), and the EQ filter is interposed between the CDR unit and the LD driver, and when the optical transceiver is a 300-pin Multi-Source Agreement (MSA) transceiver, the transmitter unit comprises a serializer, the LD driver, and a Laser Diode (LD) module, and the EQ filter is interposed between the serializer and the LD driver, wherein the EQ filter comprises:
a receiver which receives an electric signal from the CDR unit or the serializer;
an output driver which directly receives the signal outputted from the receiver; and
a pre-emphasis driver which receives the signal outputted from the receiver via a delay device, and wherein the optical transceiver comprises a filter control circuit that is connected to the micro-controller to control the EQ filter.

2. The optical transceiver of claim 1, wherein the filter control circuit comprises a Digital to Analog (D/A) Converter which converts a digital control signal for controlling the filter from the micro-controller into an analog signal; and a delay & gain controller which controls the signal from the D/A converter to provide an appropriate voltage to the filter so as to control the delay time of the delay device and the gain of the pre-emphasis driver.

3. The optical transceiver of claim 1, wherein high-frequency component of the optical transceiver is amplified using the EQ filter and thus optical output jitter is reduced.

4. A method of controlling optical output jitter using an optical transceiver that includes a transmitter unit having an equalizing (EQ) filter which can reduce jitter of a high speed electric signal, a control circuit which controls the EQ filter, a receiver unit which receives an optical signal, and a micro-controller which controls the transmitter unit and the receiver unit, the optical transceiver being an XFP transceiver (10 Gb/s small form-factor pluggable) or a 300-pin Multi-Source Agreement (MSA) transceiver, said method comprising:

reducing jitter of a high speed electric signal, wherein when the optical transceiver is a XFP transceiver (10 Gb/s Small Form-factor Pluggable), the transmitter unit comprises a Clock and Data Recovery (CDR) unit, a Laser Diode (LD) driver, and a Transmitter Optical Sub-Assembly (TOSA), and the EQ filter is interposed between the CDR unit and the LD driver, and when the optical transceiver is a 300-pin Multi-Source Agreement (MSA) transceiver, the transmitter unit comprises a serializer, the LD driver, and a Laser Diode (LD) module, and the EQ filter is interposed between the serializer and the LD driver, wherein the EQ filter comprises:
a receiver which receives an electric signal from the CDR unit or the serializer;
an output driver which directly receives the signal outputted from the receiver; and
a pre-emphasis driver which receives the signal outputted from the receiver through a delay device, and wherein the optical transceiver comprises a filter control circuit that is connected to the micro-controller to control the EQ filter and the EQ filter amplifies high-frequency component, thereby reducing optical output jitter.

5. An optical transceiver comprising
a receiver unit that receives input optical signals and generates electrical signals corresponding to the input optical signals, and
a transmitter unit that includes an input unit that receives the electrical signals generated by the receiver unit, a passive high pass equalizing (EQ) filter that receives output signals of the input unit, and means connected to the EQ filter for generating an output optical signal that corresponds to the input optical signal.

wherein the input unit of the transmitter unit is selected from the group consisting of a clock and data recovery (CDR) unit and a serializer, and
wherein the EQ filter comprises a lumped RLC device.

6. The optical transceiver of claim 5, wherein the EQ filter blocks low-frequency components, thereby reducing optical output jitter.

7. The optical transceiver of claim 5, wherein the EQ filter has a transfer function that rises monotonically from 0 GHz to at least 9 GHz.

8. The optical transceiver of claim 7, wherein the transfer function rises monotonically to at least 10 GHz.

* * * * *